(12) United States Patent
Liu

(10) Patent No.: US 8,955,489 B1
(45) Date of Patent: Feb. 17, 2015

(54) CRANKSHAFT STRUCTURE FOR MODEL ENGINE

(71) Applicant: Nai Wen Liu, Taichung (TW)

(72) Inventor: Nai Wen Liu, Taichung (TW)

( * ) Notice: Subject to any disclaimer, the term of this patent is extended or adjusted under 35 U.S.C. 154(b) by 0 days.

(21) Appl. No.: 13/975,377

(22) Filed: Aug. 26, 2013

(51) Int. Cl.
*F02B 75/32* (2006.01)
*F02B 75/34* (2006.01)

(52) U.S. Cl.
CPC .................................. *F02B 75/34* (2013.01)
USPC .................. 123/197.4; 123/73 DA; 123/73 S

(58) Field of Classification Search
CPC .............. F16C 3/06; F16C 3/20; F02B 75/34
USPC ..... 123/73 DA, 73 S, 41.86, 73 R, 73 A, 572, 123/306, 65 R, 73 BA, 65 BA, 65 PD, 65 B; 74/15.63
See application file for complete search history.

(56) References Cited

U.S. PATENT DOCUMENTS

| | | | | | |
|---|---|---|---|---|---|
| 2,031,042 | A | * | 2/1936 | Herrington | 123/73 DA |
| 2,404,833 | A | * | 7/1946 | Forster | 123/73 DA |
| 2,412,195 | A | * | 12/1946 | Arden | 123/73 DA |
| 2,463,933 | A | * | 3/1949 | Adkins | 123/68 |
| 2,529,864 | A | * | 11/1950 | Procter | 123/73 S |
| 2,547,327 | A | * | 4/1951 | King | 123/65 BA |
| 2,565,972 | A | * | 8/1951 | Kos | 123/73 DA |
| 2,833,256 | A | * | 5/1958 | Maynard | 123/73 R |
| 2,917,032 | A | * | 12/1959 | Mitchener | 123/73 D |
| 7,669,561 | B2 | * | 3/2010 | Ramella | 123/65 R |
| 2004/0079303 | A1 | * | 4/2004 | Saad et al. | 123/73 A |
| 2007/0101955 | A1 | * | 5/2007 | Lo | 123/73 A |

FOREIGN PATENT DOCUMENTS

JP        2006022797 A  *  1/2006

\* cited by examiner

*Primary Examiner* — Hung Q Nguyen

(57) ABSTRACT

A crankshaft structure for a model engine contains a body and at least one fin member. The body is formed in an elongated shaft shape and includes a cam disc disposed on a distal end thereof and a connecting shaft extending outwardly from an end surface of the cam disc, a window defined on a middle section thereof, and a channel formed therein and passing through the end surface of the cam disc so as to inhale and exhaust mixed oil gas. The at least one fin member is mounted at a position of the channel where corresponds to the window.

2 Claims, 6 Drawing Sheets

CRANKSHAFT STRUCTURE FOR MODEL ENGINE

FIELD OF THE INVENTION

The present invention relates to a crankshaft structure for a model engine in which a tilted guiding face of the counterweight block transforms the vertex into a push force so as to facilitate air input and motor output smoothly.

BACKGROUND OF THE INVENTION

Referring to FIGS. 5 and 6, a conventional model engine 1 contains a piston chamber 2, a crank chamber 3, an inlet 4, and an exhaust port 5. The piston chamber 2 has a piston 6 and a connecting shaft 7. The crank chamber 3 has a crankshaft 8, and the crankshaft 8 has a cam disc 8a with a shank 8b so as to drive the connecting shaft 7 to rotate. The crankshaft 8 has a window 8c defined on a middle section thereof and a channel 8d defined therein and passing an end surface of the cam disc 8a. Thereby, when the model engine operates, mixed oil gas flows into the crank chamber 3 from the inlet 4 via the window 8c and the channel 8d so that the piston 6 and the crankshaft 8 are driven to operate by the connecting shaft 7, and then a pressure generates above the piston chamber 2 so as to push the piston 6 to move downwardly, thereafter an orifice 2a turns on so that the mixed oil gas in the crank chamber 3 are drawn into the orifice 2a by the piston 6 and flows above the piston chamber 2, thus burning and discharging exhaust gas out of the exhaust port 5. However, when the crankshaft 8 rotates to push the mixed oil gas into the crank chamber 3, the piston chamber 2 generates a damp force, thus decreasing output power.

The present invention has arisen to mitigate and/or obviate the afore-described disadvantages.

SUMMARY OF THE INVENTION

The primary object of the present invention is to provide a crankshaft structure for a model engine in which a tilted guiding face of the counterweight block transforms the vertex into a push force so as to facilitate air input and motor output smoothly.

To obtain the above objective, a crankshaft structure for a model engine provided by the present invention contains: a body and at least one fin member.

The body is formed in an elongated shaft shape and includes a cam disc disposed on a distal end thereof and a connecting shaft extending outwardly from an end surface of the cam disc, a window defined on a middle section thereof, and a channel formed therein and passing through the end surface of the cam disc so as to inhale and exhaust mixed oil gas.

The at least one fin member is mounted at a position of the channel where corresponds to the window.

DETAILED DESCRIPTION OF THE PREFERRED EMBODIMENTS

Figure 1:
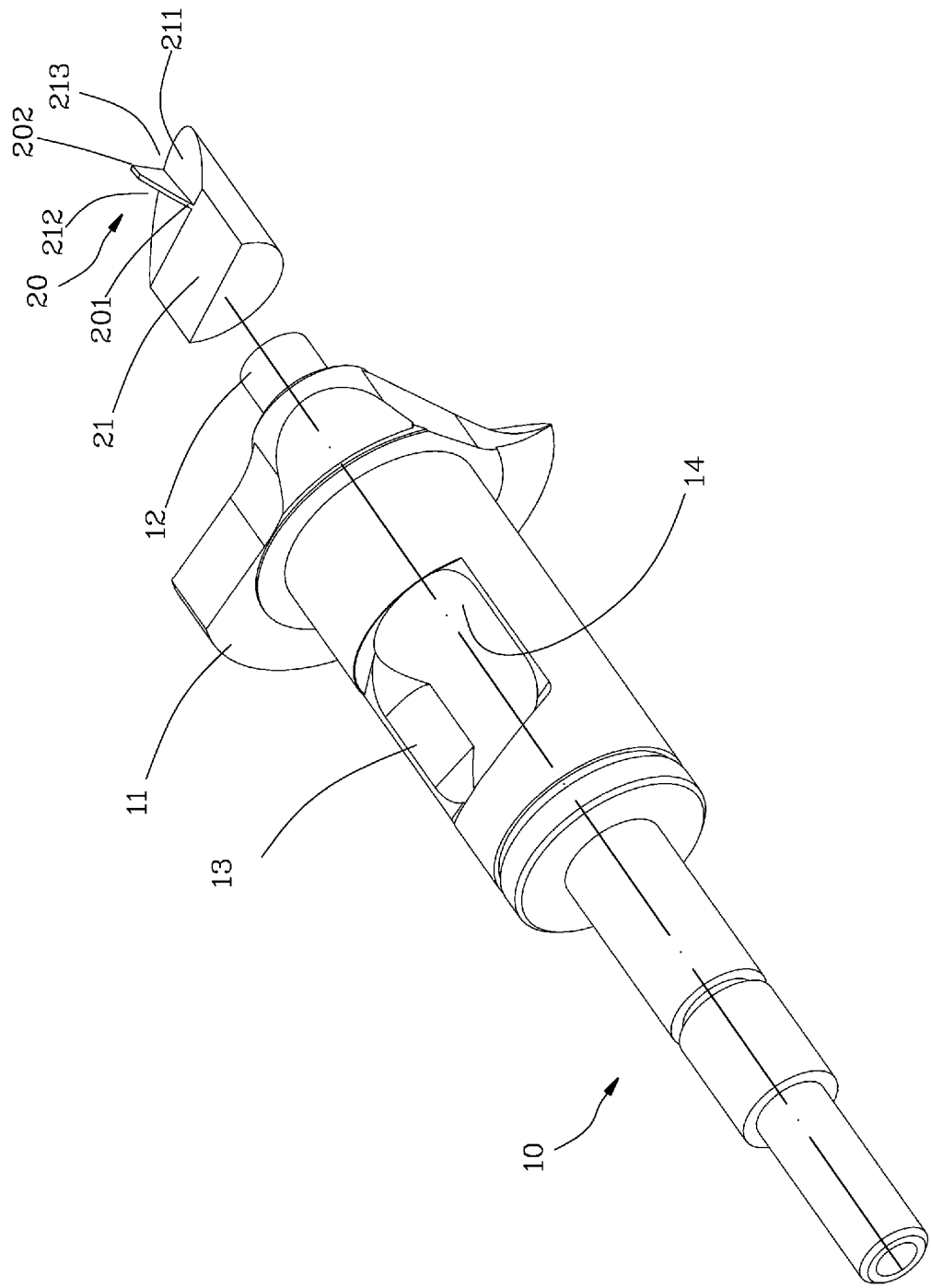
FIG. 1 is a perspective view showing the exploded components of a crankshaft structure for a model engine according to a preferred embodiment of the present invention.
Figure 2:
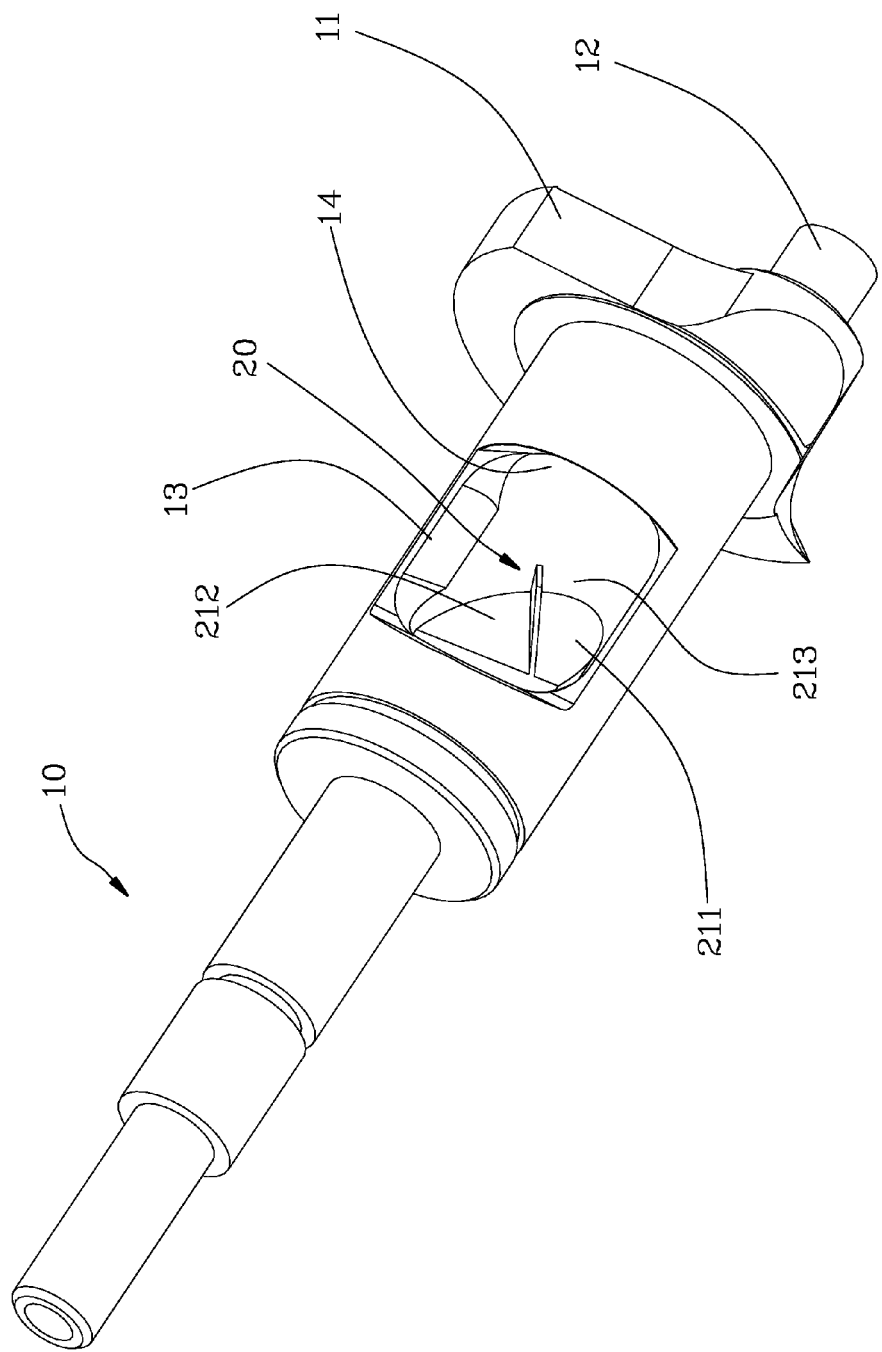
FIG. 2 is a perspective view showing the assembly of the crankshaft structure for a model engine according to the preferred embodiment of the present invention.
Figure 3:
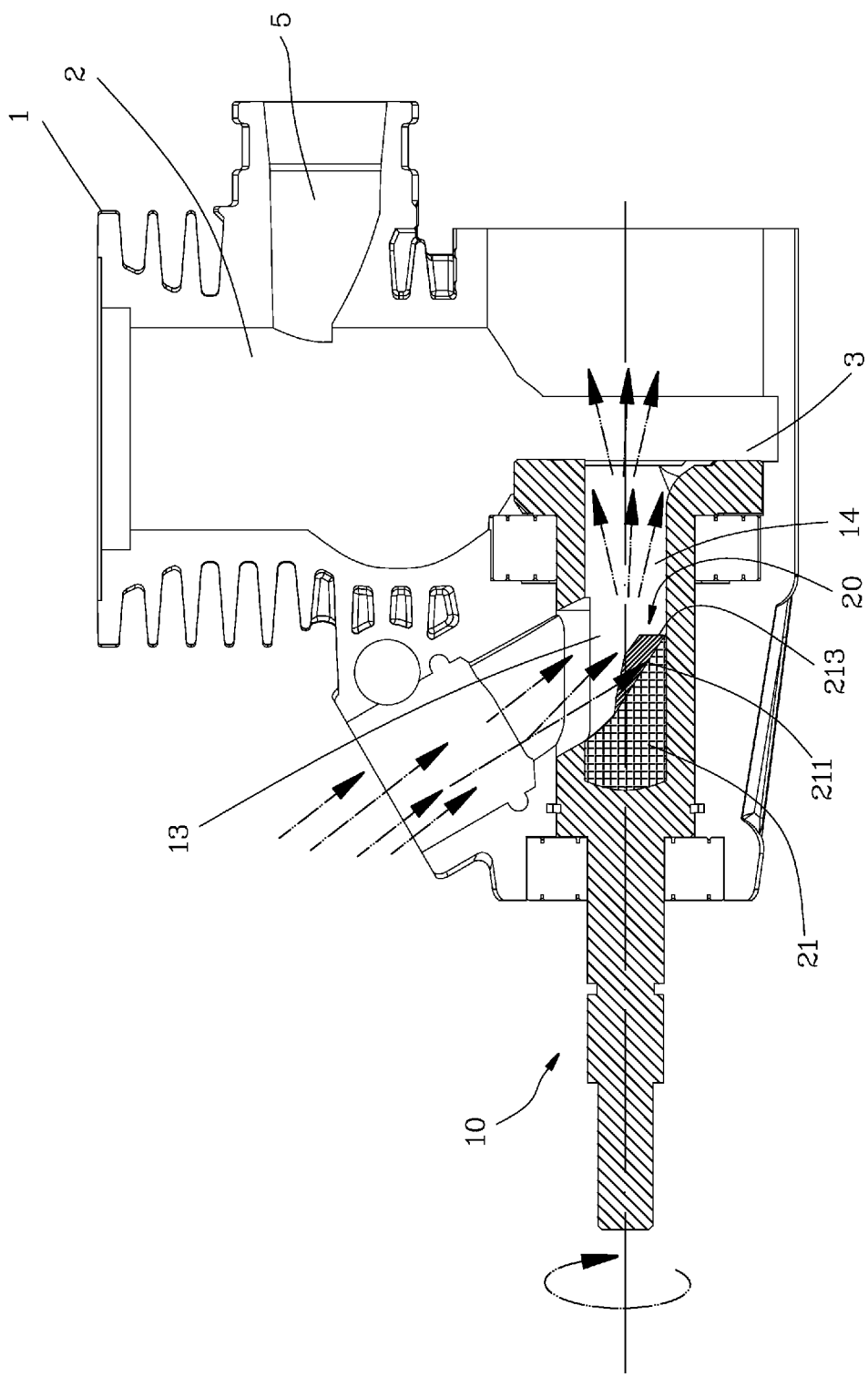
FIG. 3 is a cross sectional view showing the operation of the crankshaft structure for a model engine according to the preferred embodiment of the present invention.

With reference to FIGS. 1-2, a crankshaft structure for a model engine according to a preferred embodiment of the present invention comprises: a body 10 and at least one fin member 20.

The body 10 is formed in an elongated shaft shape and includes a cam disc 11 disposed on a distal end thereof and a connecting shaft 12 extending outwardly from an end surface of the cam disc 11, a window 13 defined on a middle section thereof, and a channel 14 formed therein and passing through the end surface of the cam disc 11 so as to inhale and exhaust mixed oil gas.

Figure 4:
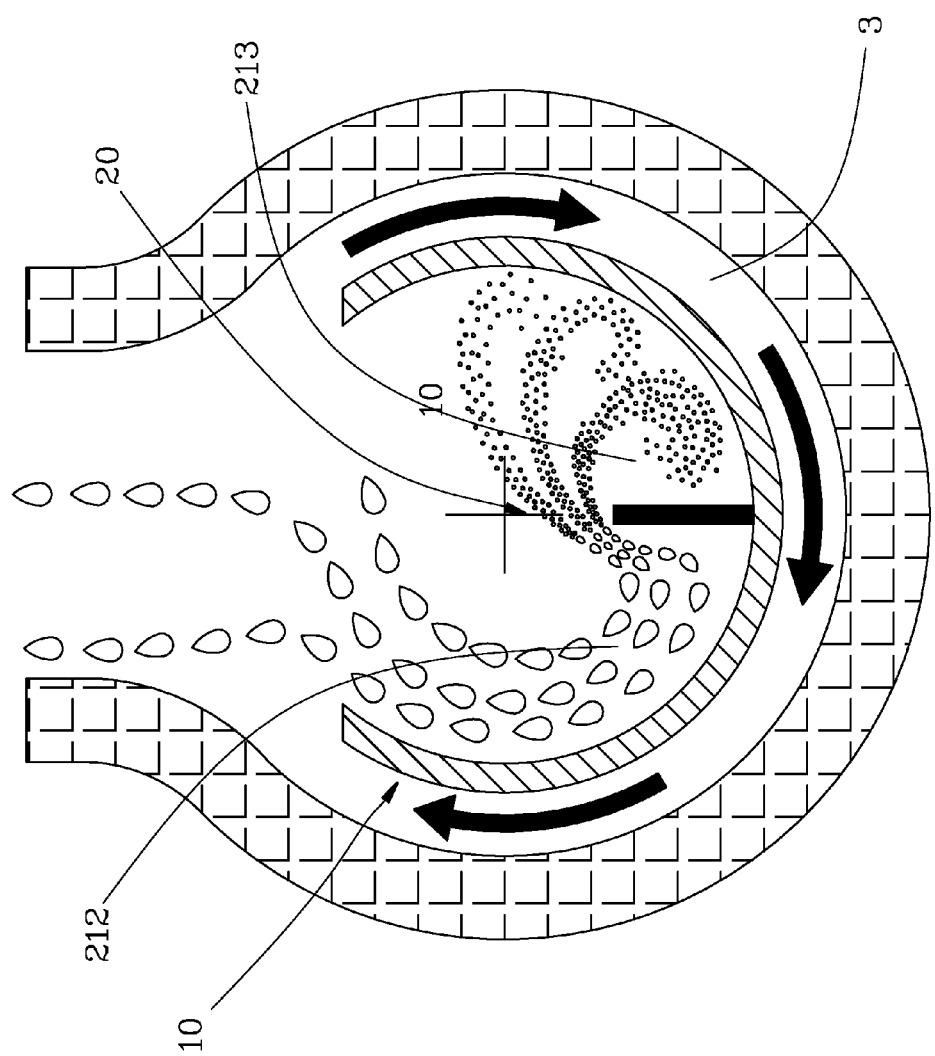
FIG. 4 is another cross sectional view showing the operation of the crankshaft structure for a model engine according to the preferred embodiment of the present invention.
Figure 5:
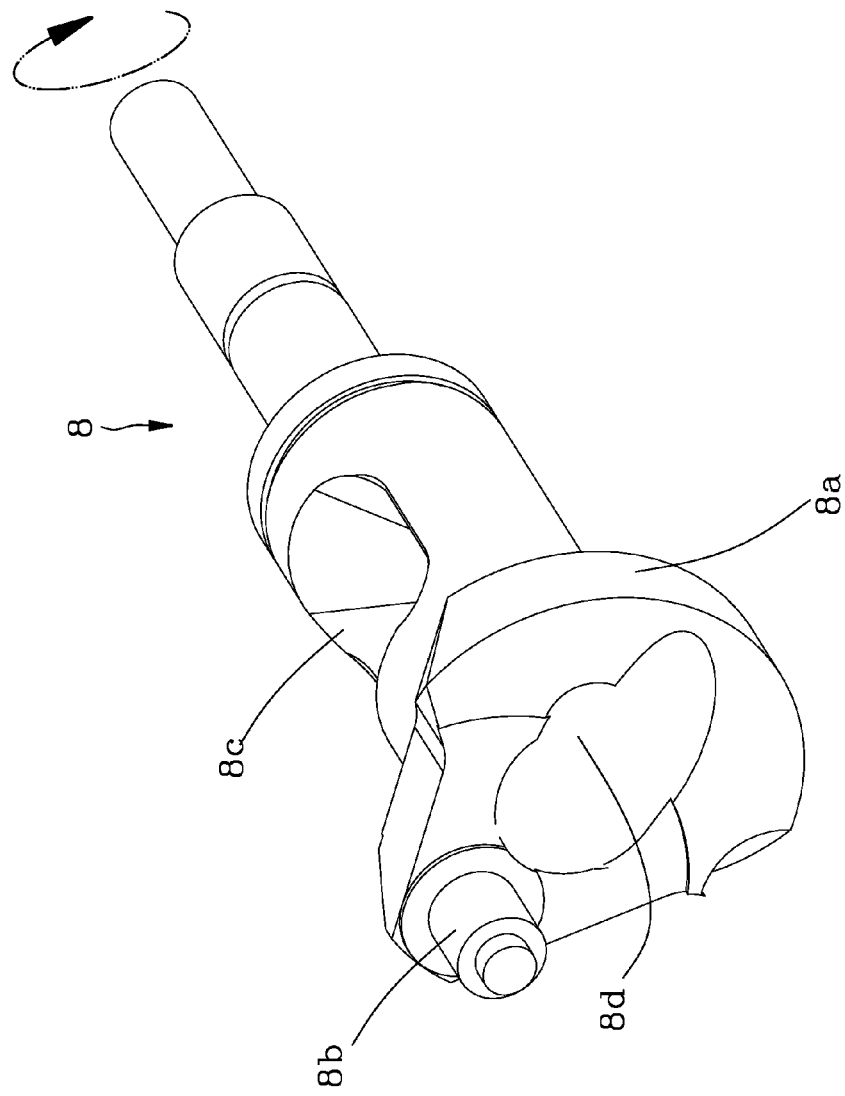
FIG. 5 is a perspective view of a conventional crankshaft.
Figure 6:
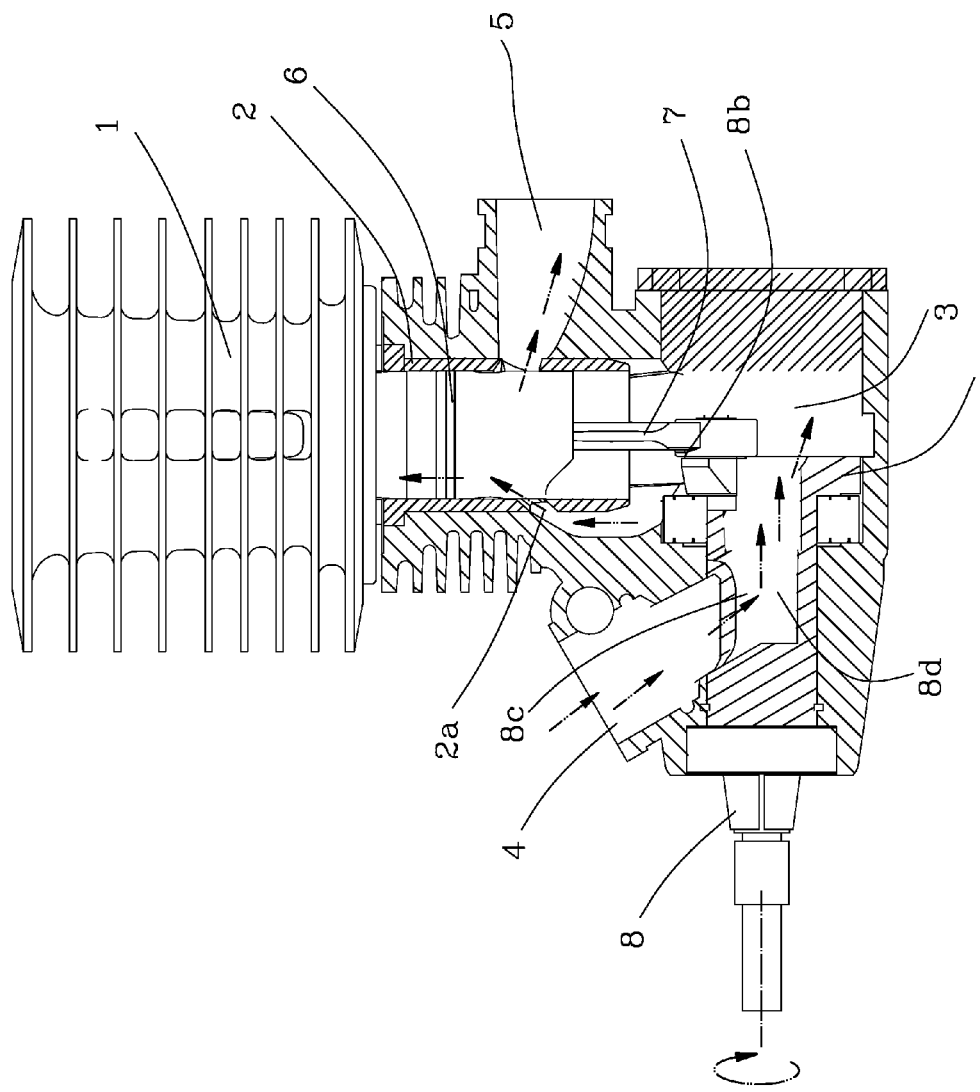
FIG. 6 is a cross sectional view showing the assembly of a conventional crankshaft of a remote control model.

The at least one fin member 20 is mounted at a position of the channel 14 where corresponds to the window 13 and includes a front fringe 201 extending obliquely upward and a rear fringe 202 extending vertically downwardly from the front fringe 201, such that a vortex produces to refine oil molecules after the mixed oil gas is rotated by the body 10 (as shown in FIG. 4). Also, the at least one fin member 20 includes a counterweight block 21 fixed on a bottom end thereof so as to match with a weight of a model engine and connecting with the channel 14, such that a rotating torque of the body 10 is increased. The counterweight block 21 has a tilted guiding face 211 arranged on a top side thereof and obliquely extending toward the cam disc 11 and a first chamber 212 and a second chamber 213 spaced from the first chamber 212 so as to guide and push the mixed oil gas separately.

Referring further to FIGS. 2 and 4, when the body 10 operates, the counterweight block 21 offsets so as to increase the rotating torque of the body 10, and then a suction force generates in the channel 14 so as to inhale the mixed oil gas into the first chamber 212 and the second chamber 213. Thereafter, the at least one fine member 20 draws the mixed gas oil simultaneously, and lower-pressure oil gas from the first chamber 212 and the high-pressure oil gas from the second chamber 213 rotate behind the rear fringe 202 of the at least one fine fringe 20, thus forming the vertex. As shown in FIG. 4, the vertex rotates horizontally and vertically so as to refine the oil molecules. In addition, the tilted guiding face 211 of the counterweight block 21 transforms the vertex into a push force so as to facilitate air input and motor output smoothly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A crankshaft structure for a model engine comprising:
a body formed in an elongated shaft shape and including a cam disc disposed on a distal end thereof and a connecting shaft extending outwardly from an end surface of the cam disc, a window defined on a middle section thereof, and a channel formed therein and passing through the end surface of the cam disc so as to inhale and exhaust mixed oil gas;

at least one fin member mounted at a position of the channel where corresponds to the window;

wherein the at least one fin member includes a counterweight block fixed on a bottom end thereof so as to match with a weight of a model engine and connecting with the channel;

the counterweight block has a tilted guiding face arranged on a top side thereof and obliquely extending toward the cam disc and has a first chamber and a second chamber spaced from the first chamber so as to guide and push the mixed oil gas separately.

2. The crankshaft structure for the model engine as claimed in claim 1, wherein the at least one fin member includes a front fringe extending obliquely upward and a rear fringe extending vertically downwardly from the front fringe.

* * * * *